United States Patent
Hill et al.

(10) Patent No.: US 11,316,869 B2
(45) Date of Patent: Apr. 26, 2022

(54) SYSTEMS AND METHODS FOR PROVIDING ATTESTATION OF DATA INTEGRITY

(71) Applicant: Cisco Technology, Inc., San Jose, CA (US)

(72) Inventors: Craig Thomas Hill, Sterling, VA (US); Frank Brockners, Cologne (DE); Shwetha Subray Bhandari, Bangalore (IN); Chennakesava Reddy Gaddam, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 160 days.

(21) Appl. No.: 16/709,532

(22) Filed: Dec. 10, 2019

(65) Prior Publication Data
US 2021/0176255 A1   Jun. 10, 2021

(51) Int. Cl.
*H04L 29/06* (2006.01)
*H04L 9/32* (2006.01)
*H04L 9/08* (2006.01)

(52) U.S. Cl.
CPC .......... *H04L 63/123* (2013.01); *H04L 9/0841* (2013.01); *H04L 9/3239* (2013.01); *H04L 63/04* (2013.01)

(58) Field of Classification Search
CPC ......... H04L 63/04; H04L 63/123; H04L 9/12; H04L 9/3239; H04L 9/3247; H04L 9/3234; H04L 9/3297; H04L 9/0838
See application file for complete search history.

(56) References Cited

U.S. PATENT DOCUMENTS

| | | | | |
|---|---|---|---|---|
| 2008/0123652 A1* | 5/2008 | Akyol | ................. | H04L 12/4633 370/392 |
| 2009/0217032 A1* | 8/2009 | Guan | .................... | H04L 63/123 713/154 |
| 2009/0262937 A1* | 10/2009 | Hirth | ..................... | H04L 9/0838 380/256 |
| 2009/0307751 A1* | 12/2009 | Lin | ........................ | H04L 63/162 726/3 |
| 2018/0302269 A1* | 10/2018 | Sankaran | ............... | H04L 63/061 |
| 2019/0116183 A1* | 4/2019 | Hussain | .................. | H04L 63/08 |
| 2019/0158279 A1* | 5/2019 | Chimakurthy | ...... | H04L 63/0876 |
| 2019/0191307 A1* | 6/2019 | Sheng | ................... | H04L 9/0838 |

(Continued)

OTHER PUBLICATIONS

"IEEE Standard for Local and metropolitan area networks-Media Access Control (MAC) Security," in IEEE Std 802.1AE-2018 (Revision of IEEE Std 802.1AE-2006), vol. No., pp. 1-239, Dec. 26, 2018, doi: 10.1109/IEEESTD.2018.8585421. (Year: 2018).*

(Continued)

*Primary Examiner* — Robert B Leung
(74) *Attorney, Agent, or Firm* — Polsinelli PC

(57) ABSTRACT

Disclosed is a method of establishing secure communications. The method includes receiving an attestation parameter associated with a first peer in a potential peer-to-peer communication, adding the attestation parameter to an MACsec Key Agreement (MKA) protocol key exchange, transmitting the key exchange from the first peer to a second peer in the potential peer-to-peer communication and upon a validation of the attestation parameter by the second peer, enabling secure communication between the first peer and the second peer.

17 Claims, 12 Drawing Sheets

(56) References Cited

U.S. PATENT DOCUMENTS

2020/0358764 A1* 11/2020 Hojilla Uy ............ H04L 9/3263

OTHER PUBLICATIONS

"IEEE Standard for Local and metropolitan area networks—Port-Based Network Access Control," in IEEE Std 802.1X-2010 (Revision of IEEE Std 802.1X-2004), vol. No., pp. 1-205, Feb. 5, 2010, doi: 10.1109/IEEESTD.2010.5409813. (Year: 2010).*

Weis B. Overview of IEEE 802.1X-REV Dynamic Session Key Agreement. In Proceedings of the 76th Internet Engineering Task Force. Nov. 2009. (Year: 2009).*

* cited by examiner

SYSTEMS AND METHODS FOR PROVIDING ATTESTATION OF DATA INTEGRITY

TECHNICAL FIELD

The subject matter of this disclosure relates to an extension of the MAC Security Key Agreement protocol to add a feature of validating the integrity of data to establish trust between two peers or other devices in a secure network environment.

BACKGROUND

The Media Access Control Security (MACsec) protocol is an 802.1AE IEEE industry standard security technology that provides secure communications for traffic between Internet links. MACsec provides point-to-point security on Internet links between directly connected nodes and is capable of identifying and preventing most security threats, such as denial of service, intrusion, man in the middle, masquerading, passive wiretapping and playback attacks.

MACsec allows administrators to secure an Ethernet link for almost all traffic, including frames from the Link Layer Discovery Protocol (LLDP). Link Aggregation Control Protocol (LACP), Dynamic Host Configuration Protocol (DHCP), Address Resolution Protocol (ARP), and other protocols that are not typically secured on an Ethernet link because of limitations with other security solutions.

MACsec provides security through the use of secured point-to-point Ethernet links. The point-to-point links are secured after matching security keys are exchanged and verified between the interfaces at each end of the point-to-point Ethernet link. The key can be user-configured or can be generated dynamically, depending on the security mode used to enable MACsec. The key exchange for MACsec leverages the MACsec Key Agreement (MKA) protocol, based on the IEEE 802.AX-REV specification for adding new capabilities to specifically support MACsec key exchange between two or more stations. The existing MACsec association relies on peer authentication to establish the session.

Once MACsec is enabled on a point-to-point Ethernet link, all traffic traversing the link is MACsec-secured through the use of data integrity checks and, if configured, encryption. The data integrity checks verify the integrity of the data. MACsec appends an 8-byte header and a 16-byte tail to all Ethernet frames traversing the MACsec-secured point-to-point Ethernet link, and the header and tail are checked by the receiving interface to ensure that the data was not compromised while traversing the link. If the data integrity check detects anything irregular about the traffic, the traffic is dropped.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
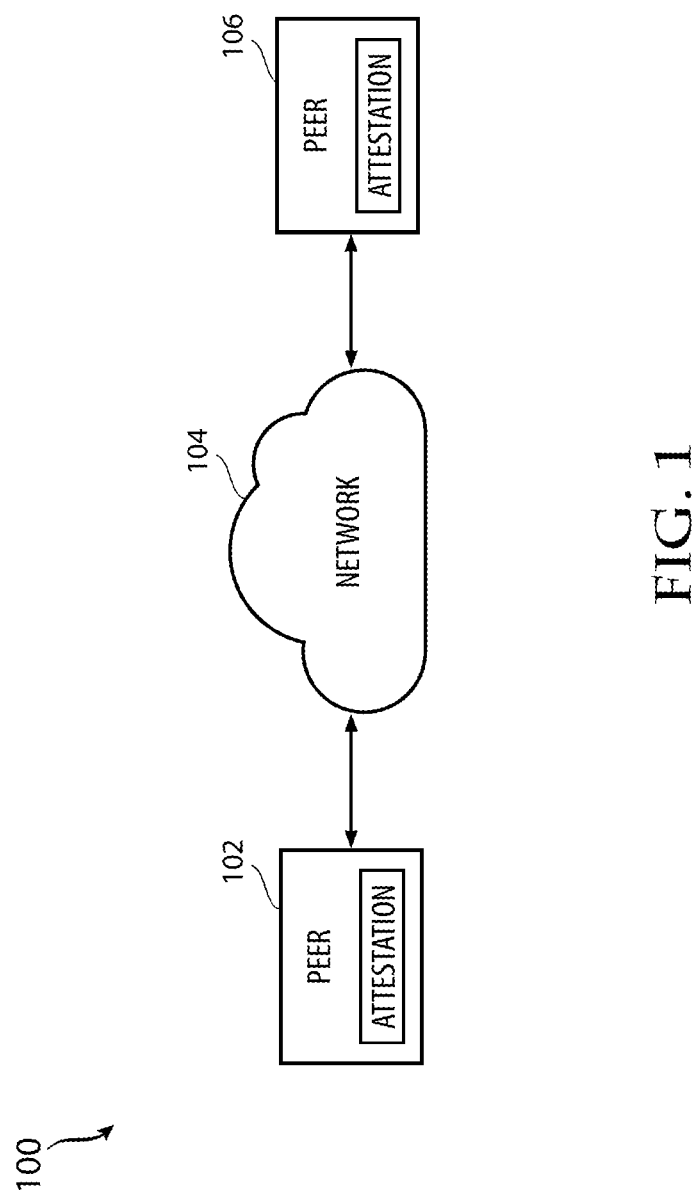
FIG. 1 illustrates the canary stamp approach.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The existing MACsec does not provide any mechanism to verify if one of the peers or devices in the communication has been compromised. For example, hardware, firmware, software of the peer could be tamped with or become compromised during the lifetime of the MACsec session or before the session. This disclosure proposes to extend the MACsec Key Agreement (MKA) protocol and the MACsec protocol to support validation of attested integrity data to thereby establish trust between two or more peers in the secure network environment to establish and maintain a MACsec session for data exchange. The process can also provide and confirm the integrity of any node or router within the secure network environment that is routing packets from one node to another node. The desire is to confirm the current state of the component in terms of one or more of its hardware, firmware, software or other parameter associated with a device in a communication. This can be done in one aspect by adding a canary stamp or similar attestation data to a MACsec protocol. In this scenario, when devices are performing an initial handshake to determine whether they can communicate or whether to continue communicating with each other, a canary stamp in a MACsec protocol exchange can include the attestation information. The devices can then make determination regarding the status of the other device based on the attestation information.

These principles can also be used to provide a confirmation of an identity of a device that is to be part of a secure communication.

An example method includes receiving an attestation parameter associated with a first peer in a peer-to-peer communication, adding the attestation parameter to a MACsec Key Agreement (MKA) protocol key exchange, transmitting the key exchange from the first peer to a second peer in the peer-to-peer communication and upon a validation of the attestation parameter by the second peer, enabling secure communication between the first peer and the second peer.

DESCRIPTION OF EXAMPLE EMBODIMENTS

Disclosed herein are systems, methods, and computer-readable media for innovations which focus on the ability to improve the use of the available bandwidth in a certain modes such as a low bandwidth mode in which a first device communicates with the second device. Other modes can apply as well, such as where a user according to an agreement should receive more bandwidth or has a higher priority than other users.

This disclosure proposes an extension of the MAC Security Key Agreement (MKA) and MACsec protocols to support validation of an attested integrity of data to establish trust between 2 or more peers in a secure network environment to establish and maintain a MACsec session for data exchange.

The IEEE 802.1AE MAC Security Protocol, or MACsec, is a MAC layer or a link layer encryption scheme and offers encryption equal to that of the Ethernet port rates (10/100/1000 Mbps) by directionally regardless of the packet size. The protocol executes the encryption function in the physical layer (PHY) of the Ethernet port. Unlike IPsec, which is typically performed on a centralized application-specific integrated circuit (ASIC) optimized for accelerating encryption, the MACsec protocol is enabled on a per report basis with no performance impact.

FIG. 1 illustrates the basic approach. The concepts disclosed herein builds upon the idea of the "canary stamp" or attestation parameter set which adds an in-depth layer of attestation information into IEEE 802.1 AE MACsec, specifically leveraging the control plane key exchange protocol of MACsec Key Agreement (MKA) protocol, extending the MKA to support transporting attestation information/messages between two or more MACsec stations 102, 106 communicating via a network 104 in an overall system 100. Furthermore, the canary stamp concept provides early insight into evidence of any device tampering, and given the level/threshold of evidence, per the operator's discretion, the link, including key material can be immediately terminated, eliminating the routing device as a possible transmitting node in the network.

FIGS. 2A-2F are next discussed which provide a more detailed discussion of various attestation approaches for providing an attestation confirmation for a node within a network. The node can be any component, router, source node, destination node, and so forth that transmits, routes, and/or receives packets. Because any of these nodes might be participating in a secure communication according to the MKA protocol, this discussion provides underlying information about how the attestation data can be obtained and used. Following the discussion of canary stamps and FIGS. 2A-2F, this disclosure will turn to FIG. 3 and resume the focus on the use of the attestation parameters in the context of the MKA protocol.

The following is a discussion introducing the use of attestation techniques for confirming that a node or device in a network has not been compromised. The technologies herein can provide proof of packet transit through uncompromised network nodes, to ensure that packets have not traversed untrusted or compromised nodes that can harm or improperly access the packets and associated data. In some examples, the technologies herein can implement proof-of-transit (POT) and attestation techniques to confirm the integrity of a node, verify that traffic traverses a defined set of nodes, and verify that such nodes have not been compromised. In some cases, such POT and attestation techniques can implement canary stamps (e.g., tokens or metadata elements containing or reflecting security measures taken at one or more nodes).

This initial discussion of systems and technologies for providing explicit verifiable proof of integrity of network nodes traversed by packets will be a foundation for the later discussion on MKA protocols.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT). Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices, and maintain these logs in trusted storage. These logs can be protected by embedding a private key into every trust anchor produced for a hardware device, and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, canary stamps, which can refer to tokens or metadata elements containing security measurements or evidence, can be used to provide verifiable evidence of device trustworthiness (e.g., integrity, state, etc.). Such verifiable evidence can be appended or included in packets transmitted by nodes on a network. The canary stamps can thus be used to evaluate the trustworthiness of a node(s) and react accordingly. For example, a device or entity can review a canary stamp associated with a node to determine that the node should not be trusted and adjust a network policy to mitigate possible damage. The details in the disclosure below provide an alteration to the MKA protocol to include a canary stamp or similar attestation parameter for identifying secure nodes or secure communications.

In some implementations, dedicated cryptoprocessors, such as a processor in a TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is a random number that can be used to introduce randomness. In some cases, a nonce can passed into a TPM and/or incorporated into a canary stamp. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push multicast, and broadcast messages. In some cases, such tokes can include canary stamps. Such tokens can be referred to as canary stamps because each signed measurement is like a stamp proving its authenticity, and like a canary in a coal mine they indicate an early sign of trouble.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, canary stamps (e.g., tokens or metadata elements) can be created by extracting current counters (e.g., clock, reset, restart) from a node's TPM, and incorporating such counters and security measures taken from the node into a packet. In some examples, the current counters and/or security measures can be hashed with information within an external TPM. The canary stamp can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of canary stamps can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example. TPM counters, timestamps, nonces, and/or time tokens. On any discrepancy, a controller or centralized device can isolate a compromised node from its network peers by shutting down the interfaces of the node.

In some examples, one or more canary stamps (e.g., tokens or metadata elements) and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained. TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, canary stamps (e.g., tokens or metadata elements containing or reflecting security measures) are used as previously mentioned to validate the integrity of a node and perform continuous evaluation of node integrity. Thus, the canary stamps described herein can be used to provide proof of transit through uncompromised nodes.

In some examples, the canary stamp can be added as additional metadata to packets that traverse a network where proof of transit via uncompromised nodes is desired. Various strategies can be implemented for transporting a canary stamp in a packet. In some cases, a canary stamp can be carried within an In-Situ (or in-band) Operations, Administration and Management (IOAM) data field.

In some implementations, a canary stamp can be carried IOAM trace data. For example, the canary stamp (e.g., the token or metadata) can be carried as part of an IOAM data field in a variety of encapsulation protocols such as, for example and without limitation, iPv4, IPv6, NSH (Network Service Header), etc. In some cases, the canary stamp can be carried in an IOAM data field as an IOAM Trace option data element (e.g., with an IOAM Trace type for node integrity canary stamp). A canary stamp or canary stamp digest can be added in the IOAM trace option of a packet by each node that forwards the packet. In the present disclosure, attestation data is added to the MACsec and/or MKA protocols.

When the packet reaches a node (e.g., the destination node and/or an intermediate node) that removes IOAM metadata (e.g., an IOAM decapsulating node), the validity of a canary stamp in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the canary stamp. This is because canary stamp measurement values can often change infrequently. The verifier may only need to validate a canary stamp or canary stamp digest carried within an IOAM data trace whenever the security measurements associated with the canary stamp or canary stamp change (e.g., a verifier may only need to check with a controller whenever it sees a node's TPM extends a Platform Configuration Register (PCR) value which was not previously confirmed by the verifier).

In some cases, when only the time ticks within a signed canary stamp increases, only the signature of the canary stamp is validated. To do this, the verifier may use the public key of any node which can place a canary stamp. Such signature validation can be done without using a controller to verify stamp measurements.

In another example, a packet can carry IOAM POT data with space optimization of canary stamp values. This example can leverage a new IOAM POT data field, which can carry canary stamp or a hash extend of a canary stamp and which can also carry canary stamp data across nodes. In some cases, a canary stamp hash extend can be a similar method as a Platform Configuration Registers (PCRs) extend operation performed by TPMs.

In some cases, the canary stamp hash extend can provide a one-way hash so that canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value II hash(canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value II hash(canary stamp of the node II PPN)). A node creating the new value for the IOAM canary stamp digest can thus take the value of any previous IOAM canary stamp digest, and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. In some cases, a verifier can be an inline device or a centralized device. Moreover, in some examples, nodes that are expected to be traversed can be identified using IOAM tracing, routing state or by sending active probes. A match between the value of POT data carrying a canary stamp digest and the expected canary stamp value can prove that the packet traversed through trusted or uncompromised nodes.

In some examples, one or more strategies can be implemented to optimize canary stamp validation. For example, canary stamps can detect attempts of a replay attack by embedding a nonce as well as TPM or TPM2 counters (e.g., clock, reset, restart). In some cases, this nonce can be part of the canary stamp and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize canary stamp validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a stamp value. A verifier can know the freshness of a stamp it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its canary stamp. To get attested time, a TUDA (Time-Based Uni-Directional Attestation) scheme such as the TUDA scheme described in https://datatracker.ietf.org/doc/draft-birkholz-i2nsf-tuda/, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the canary stamp as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value||hash(canary stamp of the node||TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received.

Further, in some cases, this approach can be implemented without also carrying a PPN or without synchronizing a nonce across nodes as previously described.

Figure 2A:
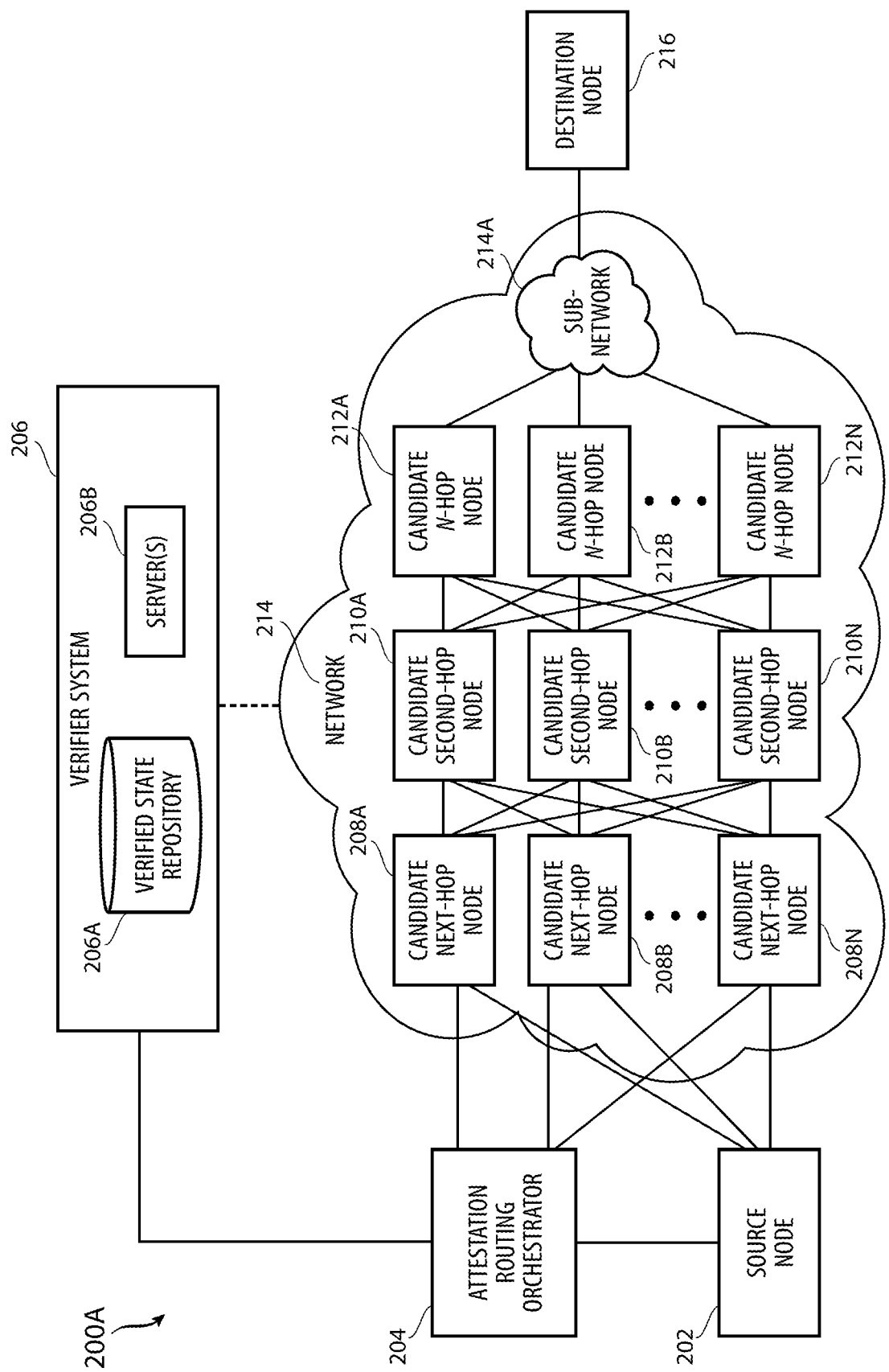
FIGS. 2A-2C illustrates example networking environments associated with attestation.

Having provided an initial discussion of example concepts and technologies for providing explicit verifiable proof of integrity of network nodes traversed by packets, the disclosure now turns to FIG. 2A.

FIG. 2A is a block diagram of an example of networking environment 200A in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 200A can include a network 214 of interconnected nodes (e.g., 208A-N, 210A-N, and 212A-N). The network 214 can include a private network, such as a local area network (LAN), and/or a public network, such as a cloud network, a core network, and the like. In some implementations, the network 214 can also include one or more sub-networks, such as sub-network 214A. Sub-network 214A can include, for example and without limitation, a LAN, a virtual local area network (VLAN), a datacenter, a cloud network, a wide area network (WAN), etc. In some examples, the sub-network 214A can include a WAN, such as the Internet. In other examples, the sub-network 214A can include a combination of nodes included within a LAN, VLAN, and/or WAN.

The networking environment 200A can include a source node 202. The source node 202 can be a networking device (e.g., switch, router, gateway, endpoint, etc.) associated with a data packet that is destined for a destination node 216. The source node 202 can communicate with candidate next-hop nodes 208A-208N on the network 214. Each of the candidate next-hop nodes 208A-208N can be included within a respective route between the source node 202 and the destination node 216. Moreover, in some cases, each of the candidate next-hop nodes 208A-208N can communicate with candidate second hop nodes 210A-210N in the network 214. Each of the candidate second hop nodes 210A-20N can similarly communicate with candidate N-hop nodes 212A-212N in the network 214.

The networking environment 200A can also include an attestation routing orchestrator 204. The attestation routing orchestrator 204 can communicate with the candidate next-hop nodes 208A-208N. In some implementations, the attestation routing orchestrator 204 can obtain attestation data (e.g., canary stamps, security measures, signatures, and/or metadata) or vectors from the candidate next-hop nodes 208A-208N. In some examples, the attestation routing orchestrator 204 can obtain additional information from candidate second-hop nodes 210A-210N and/or candidate N-hop nodes 212A-212N, and utilize the additional information in selecting a particular candidate next-hop node for a packet. In some implementations, the attestation routing orchestrator 204 can also obtain additional information from nodes that are more than two hops away (e.g., candidate third hop nodes, candidate fourth hop nodes, etc.).

The attestation routing orchestrator 204 can communicate with a verifier system 206. In some implementations, the attestation routing orchestrator 204 can obtain trusted state, such as a trusted image vector, from the verifier system 206. The verifier system 206 can include a verified state repository 206A and one or more servers 206B. In some examples, the verified state in the verified state repository 206A can include one or more verified images, verified security measurements, verified settings, verified node data, and/or any other verified trust or integrity data. In some implementations, the verified state in the verified state repository 206A can include one or more trusted states or image vectors that are known with a degree of confidence to represent uncompromised states or images (e.g., states or images that have not been hacked, attacked, improperly accessed, etc.).

As will be described in great detail with reference to FIG. 2D, in some cases, the attestation routing orchestrator 204 can select and direct a data packet to a particular candidate next-hop node of the candidate next-hop nodes 208A-208N based on a trusted state or image vector and the attestation states or vectors. Moreover, the attestation routing orchestrator 204 can direct the data packet destined for the destination node to the particular candidate next-hop node 208A-208N.

Figure 2B:
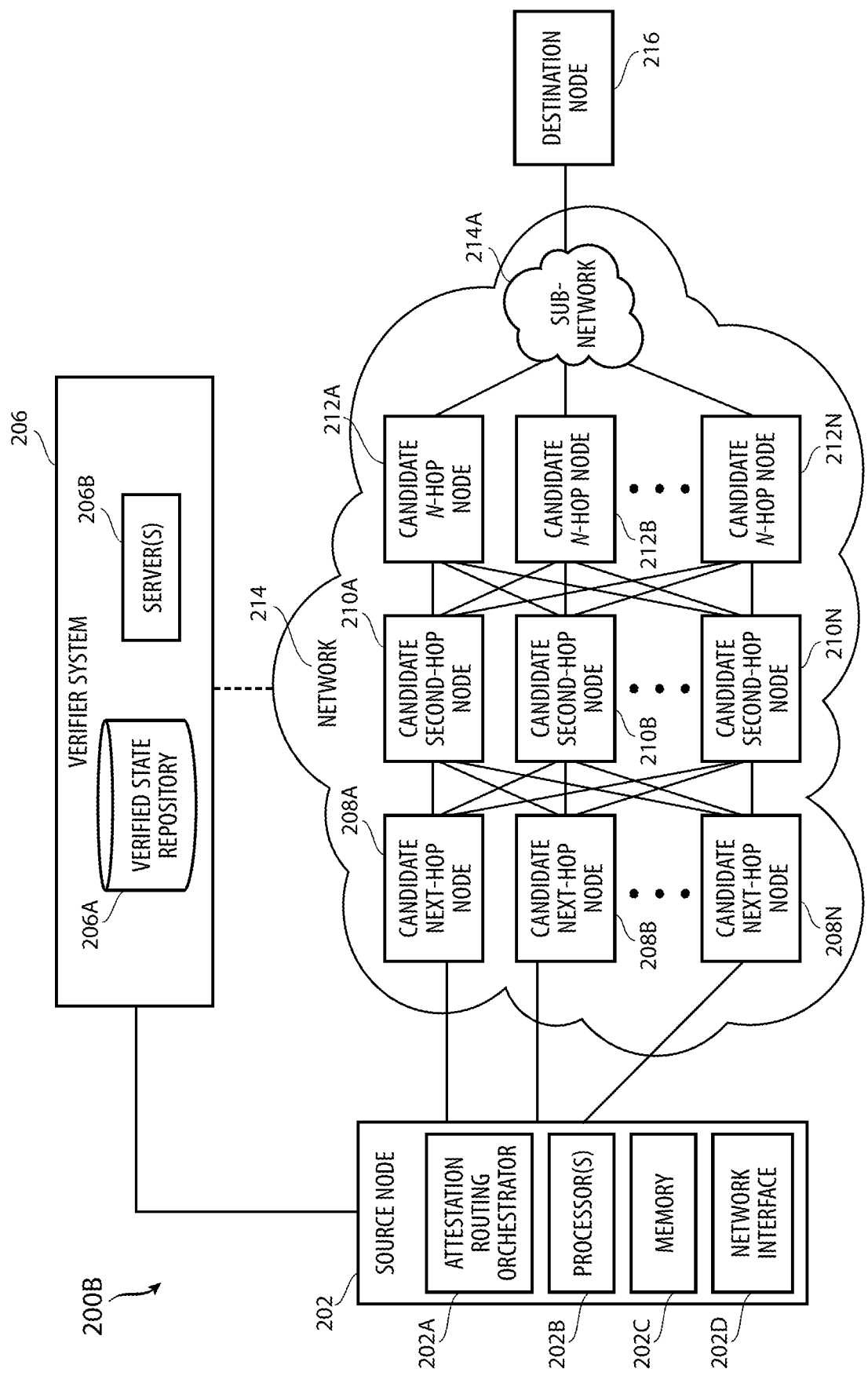

FIG. 2B is a block diagram of another example networking environment 200B in accordance with some implementations. In this example, the networking environment 200B includes a source node 202 that implements an attestation routing orchestrator 202A. In some implementations, the attestation routing orchestrator 202A can be similar to, or adapted from, the attestation routing orchestrator 204 in FIG. 2A.

The source node 202 can include one or more processors 202B. In some implementations, the one or more processors 202B can provide processing resources for generating a confidence scores for the candidate next-hop nodes 208A-208N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 216. In some implementations, the memory 202C can store a trusted state or image vector obtained from the verifier system 206. In some implementations, the memory 202C can store attestation states or vectors obtained from the candidate next-hop nodes 208A-208N and optionally attestation states or vectors obtained from the candidate second hop nodes 210A-210N and/or the candidate N-hop nodes 212A-212N.

The source node 202 can also include a network interface 202D for obtaining, receiving, and transmitting the data packets and states or vectors.

In some implementations, the source node 202 can select and direct a data packet to a particular candidate next-hop node based a trusted state or image vector and the attestation states or vectors.

Figure 2C:
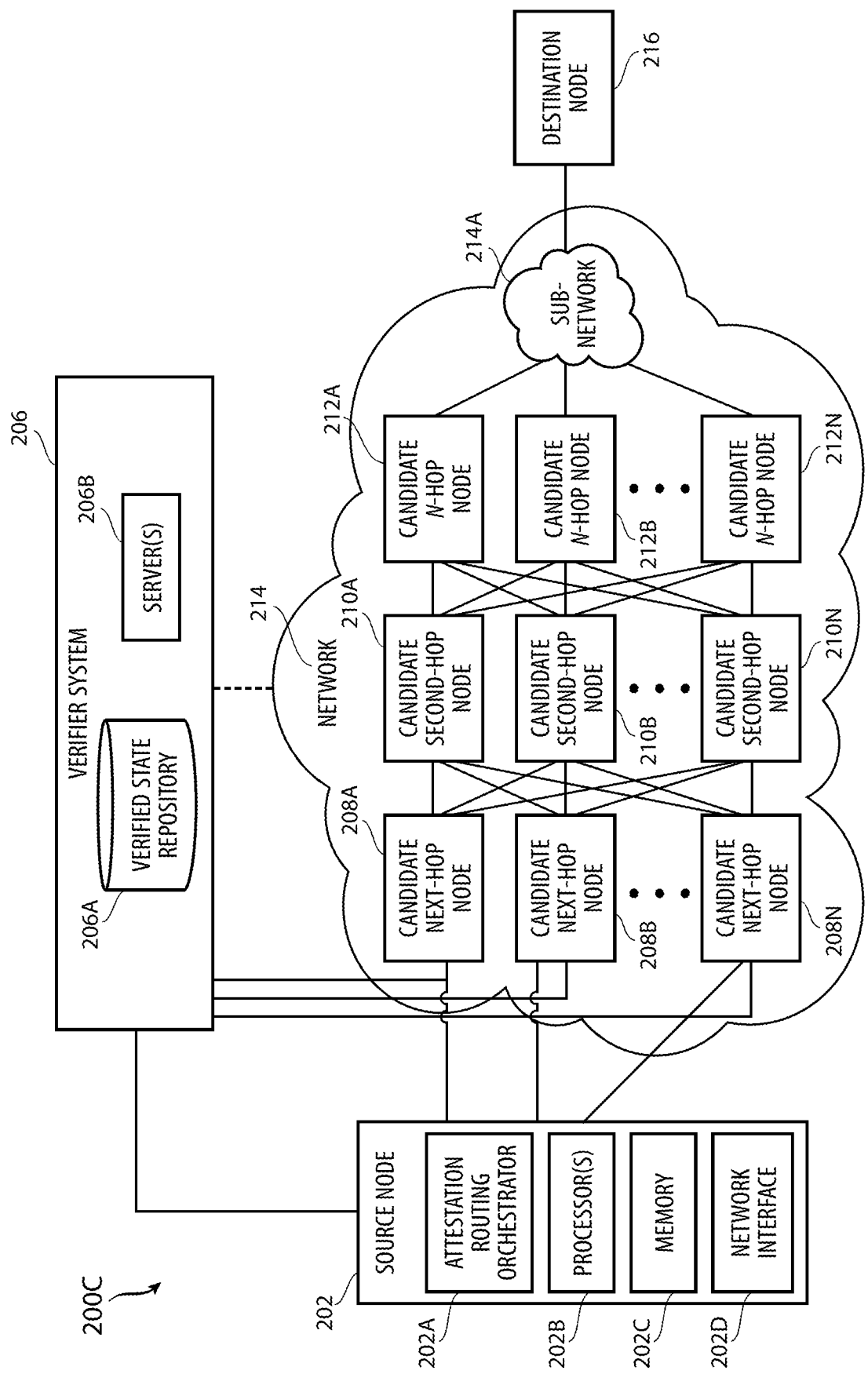

FIG. 2C is a block diagram of another example networking environment 200C in accordance with some implementations. In this example, one or more of the candidate next-hop nodes 208A-208N can relay a trusted state or image vector from the verifier system 206 to the source node 202. In some implementations, the attestation routing orchestrator 202A can be similar to, or adapted from, the attestation routing orchestrator 204 in FIG. 2A and/or the attestation routing orchestrator 202A in FIG. 2B.

In some implementations, the verifier system 206 can sign the trusted state or image vector and provide the signed trusted state or image vector to a particular candidate next hop node, which in turn can provide the signed trusted state or image vector to the source node 202. In some implementations, having the particular candidate next hop node provide the signed trusted state or image vector can reduce attestation time (e.g., the time to determine trustworthiness of the particular candidate next hop node) because the source node 202 may not need to contact a remote node (verifier system 206). In some implementations, attestation time can be further reduced because a single attestation process (e.g., the verifier system 206 signing the trusted state or image vector) facilitates the attesting of multiple source nodes. In other words, trusted states or image vectors may not be generated and evaluated on a per source node basis.

Moreover, in implementations in which the source node 202 is not connected to the verifier system 206 (e.g., link down), obtaining the trusted state or image vector from the particular candidate next hop provides an alternative mechanism for node attestation. In some implementations, the verifier system 206 appends a time-stamped response to the trusted state or image vector as part of the signing process, which can be referred to as stapling. Consequently, the source node 202 may not contact the verifier system 206 in order to attest a particular candidate next hop node.

Figure 2D:
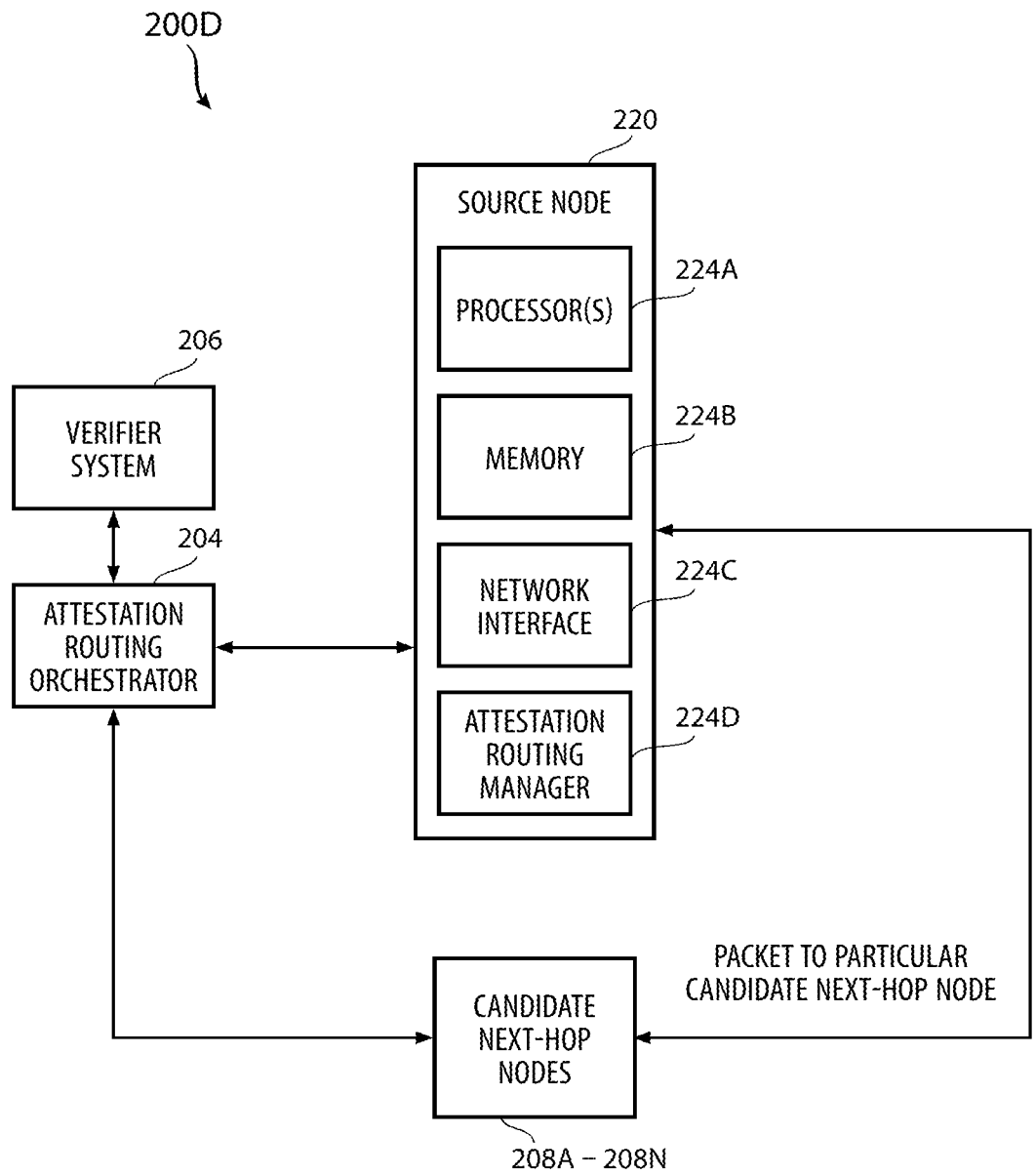
FIG. 2D illustrates an example network environment associated with an aspect of this disclosure.

FIG. 2D is a block diagram of an example controller-orchestrated attestation-based routing 200D, in accordance with some implementations. In some examples, the source node 220 is similar to, or adapted from, the source node 202 in FIG. 2A. As illustrated in FIG. 2D, the attestation routing orchestrator 204 is separate from, but coupled (e.g., connected) to, the source node 220. In some examples, the attestation routing orchestrator 204 can include a controller with knowledge of the network 214 that includes the candidate next-hop nodes 208A-N and optionally the candidate second-hop nodes 210A-N and/or the candidate N-hop nodes 212A-N.

For example, in some implementations, the attestation routing orchestrator 204 can be a network management system (NMS). As another example, in some implementations, the attestation routing orchestrator 204 can be an intent-based networking system, such as Cisco's Digital Network Architecture (DNA). As yet another example, in some implementations, the attestation routing orchestrator 204 can be a wireless LAN controller (WLC), and the candidate next-hop nodes 208A-208N and optionally the candidate second hop nodes 210A-N and/or the candidate N-hop nodes 212A-N can be networking devices such as access points, user devices, switches, routers, firewalls, etc.

The attestation routing orchestrator 204 can obtain attestation data (e.g., canary stamps) from the candidate next-hop nodes 208A-208N. Each of the candidate next-hop nodes 208A-208N can be included within a respective route between the source node 220 and a destination node (e.g., 214). In some implementations, the respective routes are independent of each other.

The attestation routing orchestrator 204 can determine confidence scores based on the attestation data. For example, in some cases, each of the confidence scores can be based on a comparison between a corresponding one of the attestation data and a trusted state or image vector. In some implementations, the attestation routing orchestrator 204 can obtain the trusted state or image vector from the verifier system 206.

In some examples, the attestation routing orchestrator 204 can obtain attestation data from candidate second-hop nodes (e.g., 210A-N) and/or candidate N-hop nodes (212A-N). Each of the candidate second-hop nodes and/or the candidate N-hop nodes can be included within a respective route between a corresponding one of the candidate next-hop nodes 208A-208N and the destination node. Moreover, each of the confidence scores can additionally be based on a comparison between a corresponding one of the attention data and the trusted state or image vector in combination with a comparison between another corresponding one of the attestation data from the candidate next-hop nodes 208A-N and the trusted state or image vector.

The attestation routing orchestrator 204 can select, from the confidence scores, a particular confidence score that satisfies one or more selection criteria. The particular confidence score is associated with a particular candidate next-hop node of the candidate next-hop nodes 208A-208N.

The attestation routing orchestrator 204 can directs, to the particular candidate next-hop node, a data packet destined for the destination node. For example, in some cases, the attestation routing orchestrator 204 can provide attested route information (e.g., validated canary stamp data, security measurements, etc.) to an attestation route manager 224D of the source node 220 in order to facilitate the source node 220 sending the data packet to the particular candidate next-hop node. The attested route information can be indicative of the trustworthiness of each of the candidate next-hop nodes 208A-208N.

For example, in some implementations, the attested route information includes an identifier (e.g., an IP address, a MAC address, an SSID, etc.) identifying a secure candidate next-hop node of the candidate next-hop nodes 208A-208N. In this example, the source node 220 can provide the data packet based on the identifier in order to route the data packet to the secure, particular candidate next-hop node.

As another example, in some implementations, the attested route information can include confidence scores associated with the candidate next-hop nodes 208A-208N. In this example, the attestation route manager 224D can select a particular candidate score based on one or more selection criteria. Moreover, the attestation route manger 224D can provide the data packet to the particular next-hop node associated with the particular candidate score. In some examples, the attestation routing orchestrator 204 can cease to direct additional data packets to the particular candidate next-hop node in response to determining that the particular confidence score falls below a confidence threshold.

In some cases, the source node 220 can include one or more processors 224A. The one or more processors 224A can provide processing resources for managing attested route information obtained from the attestation routing orchestrator 204. The source node 220 can also include a memory 224B. The memory 224B can include, for example, a non-transitory memory such as RAM, ROM, etc. In some examples, the memory 224B can store data such as the obtained attested route information and data packets to be transmitted. The source node 220 can also include a network interface 224C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation. TPM, canary stamps, Syslog, YANG Push, EEM, peer devices, traffic counters, and other sources. Visibility can be a method of identifying a compromise in a timely manner.

When there are no indicators (i.e., no security measurements or footprints available), the probability of a device being compromise can be a function of the time which has passed since a last validation that the device is in a known good state. In some cases, with the foregoing indicators, a formula can be provided for estimating probability or chance of a compromise on any given device operating within a network.

For example, $P\_v_1$ can be defined as a probability for compromise of type 1 when there is a specific set of events/signatures existing which correspond to the compromise. $P\_v_2$ can be defined as probability for compromise of type 2 and $P\_v_x$ can be defined as probability for compromise of type x. Assuming each of these compromises ($P\_v_1$ through $P\_v_x$) are independent, the following equation can provide the probability of a compromise based on recognized signatures ($P\_v$):

$$P\_v = 1 - ((1-P\_v_1)(1-P\_v_2)(1-P\_v_x)) \qquad \text{Equation (1).}$$

Other type of equations can be used instead of, or in conjunction with, equation (1) when there are interdependencies between different types of evaluated compromises ($P\_v_1$, $P\_v_2$, $P\_v_x$).

Furthermore, in some cases, a given probability (e.g., $P\_v_1$-$P\_v_x$) can be determined based on evidence of events from a device for which the probability of a compromise is being calculated (e.g., via equation (1)) and/or evidence obtained from one or more devices adjacent to the device for which the probability of a compromise is being calculated (e.g., via equation (1)).

In some cases, a probability that an invisible compromise has occurred at a device in the deployment environment can be expressed by the equation:

$$P_i = 1 - ((1 - \text{chance of invisible compromise in time period } t)^{\text{number of } t \text{ intervals since a last verification of a good/uncompromised system state}}) \quad \text{Equation (2)}.$$

Effectively knowing $P_i$ can imply that an operator knows the half-life which should be expected before a device should be considered compromised independently of any concrete evidence. It should be noted that a probability of an invisible compromise does not have to be static. Real-time modification based on current knowledge of viruses/attacks may be allowed.

With formulates for visible and invisible factors as described above (equation (1) and equation (2)), an overall probability of a compromise for a given device may be given by:

$$P_c = 1 - ((1 - P_v) * (1 - P_i)) \quad \text{Equation (3)}.$$

Equation (3) provides an indicator of trustworthiness of a given device. This metric considers both time-based entropy and any available evidence which can be correlated to known compromises.

If $P_c$ can be calculated (or roughly estimated), various functions can be efficiently prioritized. For example, a controller may schedule when to do deeper validation (or perhaps direct refresh) of a device. This scheduling could include determining when to perform active checks to validate device memory locations (locations possibly containing executable code which might have been compromised). These can be used to return the system to a known good state (and reset the entropy timer). Local configuration repositories can be refreshed based on evidence of security/trustworthiness issues underway, rather than being based just on time. Beyond the scheduling of system checks, there can be forwarding implications based on the value of $P_c$. For example, routing or switching behavior might be adjusted/impacted based on the relative trustworthiness of a remote device. Where a higher $P_c$ values exist, sensitive data traffic flows can be routed around that device.

As a further advantage of the present disclosure, it should be noted that encryption alone may be insufficient to protect sensitive flows since there are scenarios where even the fact that a flow is occurring between endpoints might be considered information to be protected (e.g., in a battlefield).

Figure 2E:
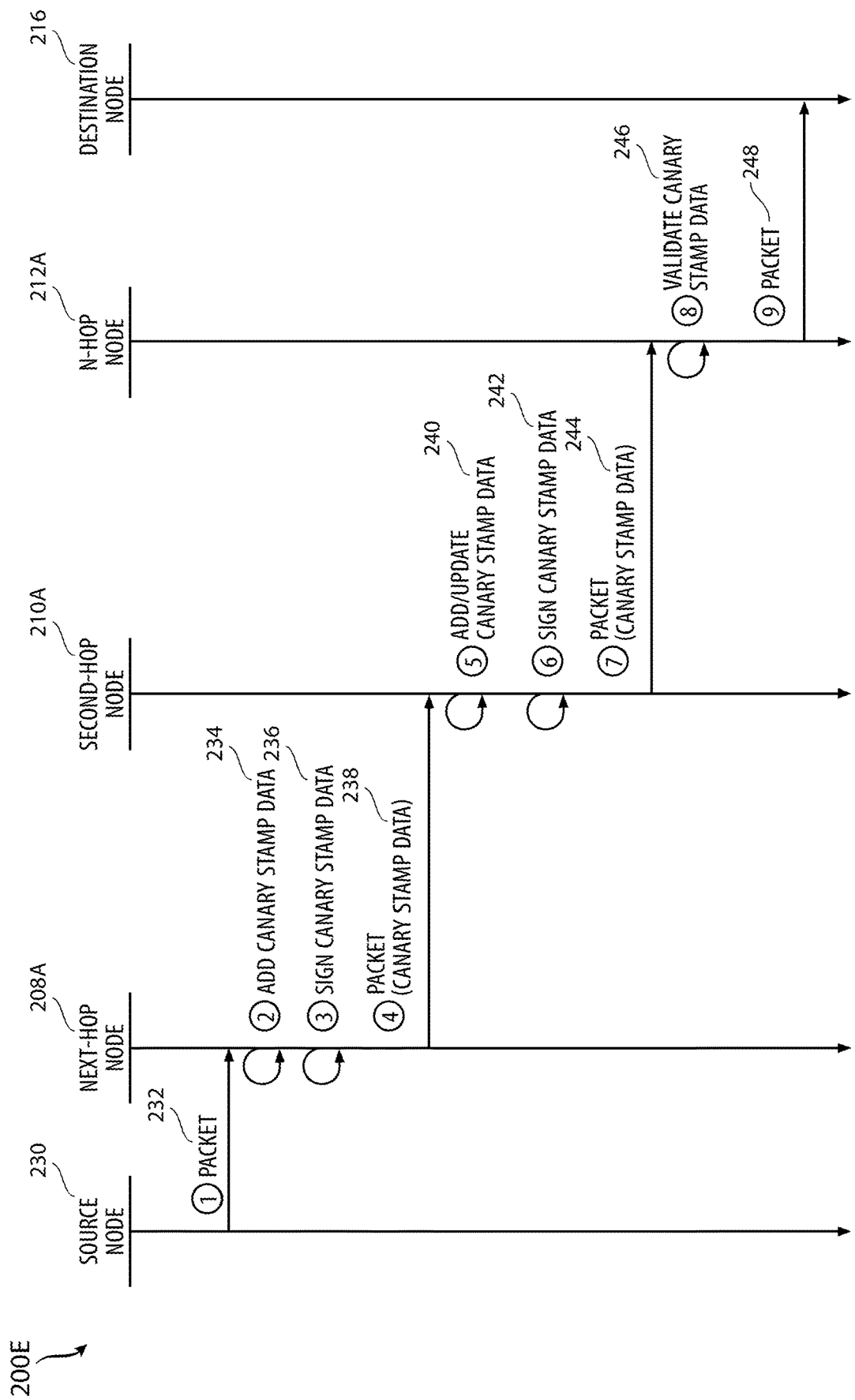
FIGS. 2E-2F example flows for providing proof of packet transit through uncompromised nodes, in accordance with some examples.

FIG. 2E illustrates an example flow 200E for providing proof of packet transit through uncompromised nodes. In this example, the source node 230 first sends (232) a packet destined to the destination node 216. The source node 230 can be similar to, or adapted from, source node 202, 220 shown in FIGS. 2A, 2B, and 2C respectively.

The packet from the source node 230 is received by a next-hop node 208A along a route to the destination node 216. When the next-hop node 208A receives the packet, it can add (234) canary stamp data to the packet. In some examples, the next-hop node 208A can include the canary stamp data in an IOAM data field on the packet. For example, in some implementations, the next-hop node 208A can add the canary stamp data in an IOAM data field as an IOAM Trace option data element which can be used to carry the canary stamp data in the packet. In other implementations, the next-hop node 208A can add the canary stamp data in a new IOAM POT (proof-of-transit) data field which can be used to carry the canary stamp data in the packet.

In other examples, the next-hop node 208A can include the canary stamp data in an Inband Network Telemetry (INT) header in the packet, an Inband Flow Analyzer (IFA) header in the packet, or a header associated with an In-situ Flow Information Telemetry (IFIT) service used to transmit the packet.

The canary stamp data added to the packet can be used to verify or prove that the next-hop node 208A is a trusted or uncompromised node. For example, a receiving device, such as a verifier system (e.g., 206) or a node along the path of the packet, can analyze the canary stamp data carried in the packet to assess whether the next-hop node 208A is trustworthy and/or compromised. The canary stamp data can include security measurements taken at the next-hop node 208A or a hash/digest of the security measurements. The security measurements can evidence the trustworthiness or integrity state of the next-hop node 208A. For example, the security measurements can include information about a current state of hardware, software, firmware, a runtime environment, etc., at the next-hop node 208A.

Such information can indicate whether the next-hop node 208A has been compromised (e.g., hacked, attacked, accessed/modified without permission, etc.); whether the next-hop node 208A has any unauthorized or untrusted hardware or software components; whether a state (e.g., firmware, hardware, software, boot files, sequence of loaded software, runtime environment, etc.) of the next-hop node 208A has been modified since deployment and/or a previous known state, which could indicate that the next-hop node has been compromised; etc. Non-limiting examples of security measurements can include a hardware state or integrity measurement, a runtime state or integrity measurement, a firmware state or integrity measurement, a software integrity measurement, information identifying what software has been loaded at the node, information identifying a sequence of software loaded at the node, any operating system changes at the node, any application log entries, an identity of the node, and/or any information that can be measured/captured to determine whether the node has been compromised and/or whether the node has had any unverified/suspicious changes.

In some examples, the security measurements can be obtained by a cryptoprocessor on the next-hop node 208A. The cryptoprocessor can provide secure storage and measurement capabilities for the next-hop node 208A. For example, the cryptoprocessor can measure what software was loaded at the next-hop node 208A during and/or since it was booted. As new software is loaded at the next-hop node 208A, the cryptoprocessor can measure the new loaded software. The cryptoprocessor in this example can thus obtain a picture of what software and files have been loaded at the next-hop node 208A and a particular sequence in which the software and files were loaded. The loaded software and files and the load sequence can be used to detect any unexpected or unusual software and files loaded in the next-hop node 208A or an unexpected or unusual load sequence, which can be used to determine whether the next-hop node 208A is trustworthy and/or has been compromised.

In some implementations, the cryptoprocessor can provide the raw security measurements for use as part (or all) of the canary stamp data. In other implementations, the cryptoprocessor can hash the security measurements and provide the hash result for use as part (or all) of the canary stamp data. Moreover, in some cases, the cryptoprocessor can sign the security measurements or a hash of the security measurements to validate the security measurements and/or protect the information against tampering (236).

In some cases, the canary stamp data can also include a time or counter value which can be used to indicate a freshness of the canary stamp data. For example, the next-hop node 208A can include a time or counter value in the canary stamp data to indicate when the security measurements associated with the canary stamp data were taken and/or an interval between the time when the current security measurements were taken and the time when previous security measurements were taken.

The freshness information can allow a device reviewing or verifying the canary stamp data to determine whether the associated security measurements are sufficiently fresh to be reliable and/or to prevent a malicious actor from simply re-using old data to trick a verifying device. In some cases, the time or counter value can include, for example and without limitation, one or more TPM counters (e.g., clock, reset, restart), a timestamp, or a TUDA time-synchronization token.

In some cases, the canary stamp data can also include one or more nonce values. The one or more nonce values can be used to insert randomness into the canary stamp data to prevent potential replay attacks. In some examples, the one or more nonce values can be provided to the next-hop node 208A by a remote or centralized system, such as the verifier system 206, for example. The remote or centralized system can provide such nonce values to nodes for use in respective canary stamp data in order to insert randomness into such data, as previously described. In such examples, since the nonce values used in canary stamp data are provided and known by the remote or centralized system, the remote or centralized system (and/or a separate verifier system) knows what the values in the canary stamp data and/or the nonce values in the canary stamp data should be or are expected to be, which can allow the remote or centralized system (and/or the separate verifier system) to validate such data and prevent replay attacks.

In some cases, in addition to adding the canary stamp data to the packet, the next-hop node 208A can also cryptographically sign the canary stamp data. In some examples, the next-hop node 208A can sign some or all of the canary stamp data using an encryption algorithm and/or an encryption key, such as a public key provided by a remote or centralized system (e.g., verifier system 206). Moreover, in some examples, the next-hop node 208A can sign some or all of the canary stamp data using a cryptoprocessor on the next-hop node 208A, as previously explained.

Once the next-hop node 208A has added the canary stamp data to the packet, the next-hop node 208A can send (238) the packet with the canary stamp data to the second-hop node 210A. In some implementations, the second-hop node 210A can receive the packet and add/update (540) the canary stamp data in the packet to include canary stamp data associated with the second-hop node 210A. For example, in some cases, the second-hop node 210A can add additional canary stamp data to the packet so the packet includes canary stamp data from both the next-hop node 208A and the second-hop node 210A. Similar to the canary stamp data associated with the next-hop node 208A, the additional canary stamp data associated with the second-hop node 210A can include security measurements taken from the second-hop node 210A.

In other cases, the second-hop node 210A can update the canary stamp data in the packet with new canary stamp data representative of the canary stamp data from the next-hop node 208A and canary stamp data from the second-hop node 210A. To illustrate, in some cases, the canary stamp data in the packet received by the second-hop node 210A can include a canary stamp digest from the next-hop node 208A. The canary stamp digest from the next-hop node 208A can include a hash of the security measurements taken at the next-hop node 208A. The second-hop node 210A can then create a hash of security measurements taken from the second-hop node 210A to create a canary stamp for the second-hop node 210A. The second-hop node 210A can then update or replace the canary stamp data in the packet with a new canary stamp digest, which can be a digest of the canary stamp digest from the next-hop node 208A and the canary stamp of the second-hop node 210A (e.g., the hash of the security measurements taken from the second-hop node 210A).

This way, the new canary stamp digest included in the packet by the second-hop node 210A can represent both the canary stamp digest (and the security measurements) from the next-hop node 208A and the canary stamp digest (and the security measurements) from the second-hop node 210A. In some examples, each hop that receives the packet can similarly update the canary stamp data in the packet to include a new canary stamp digest. The final version of the canary stamp digest in the packet to the destination node 216 can thus reflect or represent the canary stamp digest (and the security measurements) from each node along the path of the packet. A verifier system (e.g., 206) or an inline node can compare that final version of the canary stamp digest in the packet with an expected canary stamp digest calculated based on expected security measures for each of the nodes in the path, to validate (or invalidate) the final version of the canary stamp digest.

In some cases, the second-hop node 210A can also sign (242) some or all of the canary stamp data added or updated by the second-hop node 210A, as previously explained. The second-hop node 210A can then send (244) the packet with the new or updated canary stamp data, along the path to the N-hop node 212A. The N-hop node 212A can receive the packet and validate (246) the canary stamp data in the packet.

In some examples, when validating the canary stamp data, the N-hop node 212A can check any signatures, nonce values, and/or time or counter values in the canary stamp data to verify that the canary stamp data has not been tampered with and is sufficiently fresh to be reliable. Moreover, in some cases, to validate the canary stamp data, the N-hop node 212A can compare the canary stamp data in the packet with an expected canary stamp data value(s) calculated based on the nodes traversed by the packet and associated security measurements (or expected security measurements).

For example, the N-hop node 212A can create a digest of a known or previous state (e.g., known or previous security measurements) of each node traversed by the packet and compare the resulting digest with a canary stamp digest in the packet. If the digests match, the N-hop node 212A can determine that the nodes traversed by the packet have not have had changes in state and/or are not compromised. In some cases, if the digests do not match, the N-hop node 212A can check the security measurements from one or more nodes along the path of the packet to determine which node has had a change in state and/or is potentially compromised.

If the N-hop node 212A determines that a node is compromised or is unable to verify that the node is not compromised, the N-hop node 212A report such findings or otherwise trigger a remediation action to avoid a potential compromise of data and/or network resources. For example, if a node is determined to be compromised or its trustworthiness/integrity cannot be confirmed, a policy can be implemented on the network to avoid routing traffic through that node until that node can be returned to a normal state or confirmed to not be compromised. As another example, if a node is determined to be compromised or its trustworthiness/integrity cannot be confirmed, the node can be powered off or removed from the network until the node can be returned to a normal state or confirmed to not be compromised.

In other cases, to validate the canary stamp data, the N-hop node 212A can check security measurements included in the canary stamp data and associated with each node along the path of the packet to determine if any of the nodes have had a change in state and/or have unusual, unexpected, and/or potentially problematic security measurements. For example, the N-hop node 212A can compare a security measurement(s) from each node with an expected security measurement(s) or previous known good security measurement(s) from each node to determine if any node has had a change in state and/or is potentially compromised.

In some cases, to validate the canary stamp data, the N-hop node 212A can check if the canary stamp data matches a previous version of the canary stamp data to determine if any state changes have occurred on any of the nodes along the path of the packet. The N-hop node 212A can also check a nonce and/or time or counter value to verify that the canary stamp data is fresh and is not part of a replay attack. If the canary stamp data matches the previous version of the canary stamp data, the canary stamp data is fresh, and there are no indications of a possible replay attack, the N-hop node 212A can determine that none of the nodes have had a change in state and validate the canary stamp data. The validated canary stamp data can indicate that the nodes along the path of the packet are not currently compromised.

The N-hop node 212A can then send (248) the packet to the destination node 216. In some cases, prior to sending the packet to the destination node 216, the N-hop node 212A can add/update the canary stamp data to include canary stamp data from the N-hop node 212A and/or reflect security measurements from the N-hop node 212A. The N-hop node 212A can send the packet to the destination node 216 with the current version of the canary stamp data to allow the destination node 216 itself verify that the packet traversed only through uncompromised nodes. Moreover, in some cases, prior to sending the packet, the N-hop node 212A can also sign the canary stamp data as previously described.

In some cases, in validating the canary stamp data as described herein, the N-hop node 212A can determine or verify whether the packet traversed through uncompromised nodes or whether the packet traversed through one or more compromised nodes. Moreover, in some implementations, in addition to, or in lieu of, validating the canary stamp data, the N-hop node 212A can send the packet with the canary stamp data to a separate device for validation/verification. For example, the N-hop node 212A can send the packet with the canary stamp data to a verifier system (e.g., 206) to have the verifier system validate the canary stamp data and confirm or determine that the packet has or has not traversed through compromised and/or uncompromised nodes.

In some cases, every hop in the chain of hops traversed by the packet can provide canary stamp data and sign such canary stamp data so that all hops in the chain can be verified to be uncompromised. For example, in addition to the nodes along the path of the packet providing or updating canary stamp data as previously described, if the packet is sent to a separate verifier system for verification, the verifier system can similarly modify the packet to add or update canary stamp data to include or reflect its own canary stamp data (and/or security measurements) and prove that the verifier system is not compromised.

While FIG. 2E shows the canary stamp data in the packet being validated by the last hop (e.g., the N-hop node 212A) before the destination node 216, it should be noted that the canary stamp data can also or alternatively be validated by one or more other nodes in the path and/or a remote verifier system (e.g., 206). For example, in some cases, the canary stamp data in the packet can be validated by a centralized verifier system (e.g., at each hop or at one or more hops along the path) and/or by one or more intermediate nodes along the path (e.g., as the packet traverses those nodes). In FIG. 2E, the validation performed by the N-hop node 212A is one illustrative example provided for explanation purposes.

In each case in the discussion above, the introduction of the use of adding canary stamp data to a revised version of the MACsec protocol or the MKA protocol can apply.

Figure 2F:
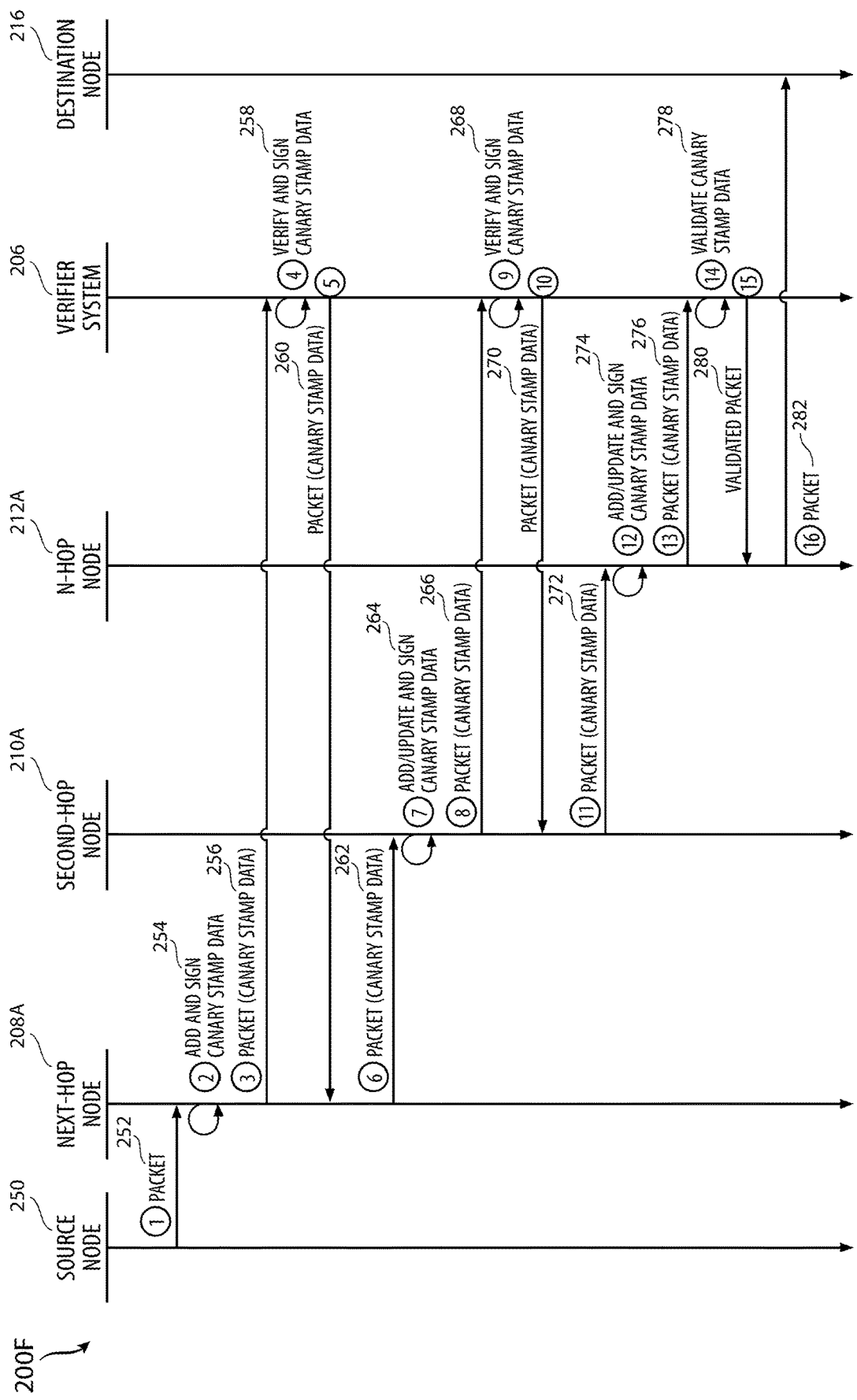

FIG. 2F illustrates another example flow 200F for providing proof of packet transit through uncompromised nodes, where a verifier system 206 verifies and signs canary stamp data at each hop along the path of the packet. It should be noted that this is one illustrative example implementation provided for explanation purposes, and in other examples the verifier system 206 may only verify and sign canary stamp data at one or more hops along the path of the packet.

In this example, the source node 250 first sends (252) a packet for the destination node 216 to the next-hop node 208A. The next-hop node 208A receives the packet and adds and signs (254) canary stamp data generated based on security measurements taken at the next-hop node 208A (e.g., via a cryptoprocessor). The next-hop node 208A can add canary stamp data containing the security measurements or a digest of the canary stamp data (e.g., the security measurements), as previously explained.

The next-hop node 208A can then send (256) the packet with the canary stamp data to the verifier system 206 for validation. In some examples, the verifier system 206 can be a centralized system, such as a centralized server or controller, configured to analyze and verify canary stamp data from nodes. In other examples, the verifier system 206 can be a distributed system including multiple verifiers configured to analyze and verify canary stamp data from nodes.

The verifier system 206 can receive the packet from the next-hop node 208A and verify and sign (258) the canary stamp data in the packet. In some cases, the verifier system 206 can check that the canary stamp data in the packet from the next-hop node 208A is fresh (e.g., based on a nonce and/or a time value or counter on the packet) and use the canary stamp data to verify that the next-hop node 208A is not compromised. The verifier system 206 can also check that the canary stamp data in the packet is not part of a replay attack. For example, the verifier system 206 can verify that the canary stamp data is not simply a copy of old canary stamp data added to the packet by an attacker or compromised component to trick the verifier system 206 into determining that the canary stamp data is valid and the next-hop node 208A has not been compromised. In some examples, the verifier system 206 can use, or check for, nonce values that introduce randomness into the data, to identify and/or protect against such replay attacks.

In some cases, when verifying and signing the canary stamp data in the packet, the verifier system 206 can add its own signed canary stamp data to the packet or update the canary stamp data with its own canary stamp data as previously explained. This way, every hop that processes the packet can be verified, and other nodes can verify that the verifier system 206 itself is not compromised.

The verifier system 206 can then send (260) the packet with the canary stamp data back to the next-hop node 208A. At this point, the canary stamp data in the packet received by the next-hop node 208A is validated and signed by the verifier system 206. The next-hop node 208A can then send (262) the packet with the canary stamp data to the second-hop node 210A. The canary stamp data in the packet can include the canary stamp and signature from the next-hop node 208A. In some cases, the canary stamp data in the packet can also reflect canary stamp data and signature data from the verifier system 206, as previously explained.

The second-hop node 210A then add/update and sign (264) the canary stamp data in the packet. In some examples, the second-hop node 210A can add new canary stamp data generated based on security measurements taken at the second-hop node 210A. Here, the packet can include the canary stamp data from the next-hop node 208A and the new canary stamp data from the second-hop node 210A. In other examples, the second-hop node 210A can take the canary stamp data from the next-hop node 208A and update it to also reflect new canary stamp data (and/or security measurements) from the second-hop node 210A.

For example, the second-hop node 210A can hash the security measurements taken at the second-hop node 210A and generate a digest based on a hash value or digest from the next-hop node 208A (e.g., the canary stamp data from the next-hop node 208A) and the hash of the security measurements taken at the second-hop node 210A. To illustrate, the second-hop node 210A can generate a new canary stamp digest as follows: New canary stamp digest=Digest of (canary stamp data from the next-hop node 208A∥hash(canary stamp data from the second-hop node 210A)).

In some cases, the second-hop node 210A can also implement a nonce value and/or a time value or token when calculating the new canary stamp data. For example, in some cases, the second-hop node 210A can generate the new canary stamp digest as follows: New canary stamp digest=Digest of (canary stamp data from the next-hop node 208A∥hash(canary stamp data from the second-hop node 210A∥PPN)), where PPN represents a per-packet nonce (PPN) assigned to the current packet and which changes per packet. As another example, in some cases, the second-hop node 210A can generate the new canary stamp digest as follows: New canary stamp digest=Digest of (canary stamp data from the next-hop node 208A∥hash(canary stamp data from the second-hop node 210A∥TUDA time-synchronization token associated with the second-hop node 210A)), where the TUDA time-synchronization token is provided by a central timestamp authority.

In some cases, when adding/updating canary stamp data, the second-hop node 210A can concatenate or combine canary stamp data from the next-hop node 208A and the second-hop node 210A. For example, in some cases, the canary stamp data from the next-hop node 208A can include one or more security measurements taken at the next-hop node 208A. To add/update canary stamp data, the second-hop node 210A can concatenate or combine such security measurements with one or more other security measurements taken at the second-hop node 210A. This can result in canary stamp data that includes and/or reflects security measurements from both the next-hop node 210A and the second-hop node 210A.

Once the added/updated and signed the canary stamp data, the second-hop node 210A can send (624) the packet with the new/updated canary stamp data to the verifier system 206. The verifier system 206 can then verify and sign (268) the canary stamp data as previously explained. After verifying and signing the canary stamp data, the verifier system 206 can send (270) the packet with the canary stamp data back to the second-hop node 210A. In some cases, when verifying the canary stamp data, the verifier system 206 can also add/update the canary stamp data with its own canary stamp data generated based on security measurements taken at the verifier system 206, and sign the result prior to sending the packet with the canary stamp data to the verifier system 206.

The second-hop node 210A can receive the packet with the canary stamp data and send (272) it to the N-hop node 212A. The N-hop node 212A can receive the packet with the canary stamp data and add/update and sign (274) the canary stamp data as previously described with respect to the second-hop node 210A. The N-hop node 212A can then send (276) the packet with the new or updated canary stamp data to the verifier system 206. The verifier system 206 can receive the packet with the canary stamp data from the N-hop node 212A, and validate (278) the canary stamp data in the packet.

When validating the canary stamp data, the verifier system 206 can use the canary stamp data in the packet to verify that none of the nodes (e.g., 208A. 210A, 212A) traversed by the packet are compromised. The verifier system 206 can verify the integrity or trustworthiness of each of the nodes based on the value(s) in the canary stamp data (e.g., the associated security measures, the associated digest values, etc.). Since the canary stamp data can contain security measures from each of the nodes or reflect security measures from each of the nodes (e.g., the canary stamp data can be updated at each hop based on security measures at that hop or a digest of security measures at that hop), the canary stamp data can provide an indication of the state and integrity/trustworthiness of each hop in the chain, which the verifier system 206 can use to validate (or invalidate) the canary stamp data in the packet.

In some implementations, when validating the canary stamp data, the verifier system 206 can also verify that the canary stamp data is fresh (e.g., was generated within a certain period of time from the time it was received by the verifier system 206) and/or that the canary stamp data is not a replay attack. The verifier system 206 can make such determinations based on timing information (e.g., one or more TUDA time-synchronization tokens, a time or counter value such as a TPM counter value, etc.) included in the canary stamp data and/or associated with the nodes in the path, one or more nonce values used to introduce randomness in the canary stamp data, etc.

Moreover, in some examples, when validating the canary stamp data, the verifier system 206 can also add its own signed canary stamp data to the packet or update the canary stamp data in the packet based on its own canary stamp data.

Once the verifier system 206 has validated the canary stamp data, the verifier system 206 can send (280) the packet with the validated canary stamp data back to the N-hop node 212A, which can then send (282) the packet to the destination node 216.

In some cases, rather than sending the packet to the N-hop node 212A, the verifier system 216 can deliver the packet to the destination node 216, thereby reducing the amount of traffic (e.g., by eliminating the communication of the packet back to the N-hop node 212A for subsequent delivery to the destination node 216). Moreover, in some cases, the packet delivered (e.g., by the N-hop node 212A or the verifier system 206) to the destination node 216 can include the current version of the canary stamp data to allow the destination node 216 to perform its own verification that the packet traversed only through uncompromised nodes.

Further, an attestor, e.g. a node or a verifier, can use random numbers, otherwise pseudo-random numbers, created by peers and/or the attestor to generate and verify attestation information. Specifically, the attestor can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attestor, can use the result created by the cryptoprocessor, to verify/validate that their corresponding provided random number was used in generating the nonce ultimately used by the cryptoprocessor to create the result. In turn, the layer 2 peers, potentially including the attestor, can generate verified attestation information based on the random numbers generated by the peers, the nonce created from the random numbers, and/or the result created by the cryptoprocessor from the nonce.

MKA Protocol Expansion for Attestation Data

Having discussed the canary stamp or attestation data and processes above, the disclosure returns to the application of the canary stamp or attestation data in the MKA protocol. The MKA offers the ability for extents ability of the peer exchange. A MACsec station 102, 106 could declare itself as having attestation trust capabilities. To further extend the capabilities, the system can include an option for the operator that manages two stations to establish MACsec peering capabilities, they must both have, for example, TPM capabilities with canary stamps, or the MKA/MACsec session will not be established. For those nodes without the capabilities for TPM and/or attestation, the option would exist for "should" have to extend the MKA protocol to add support for attestation messages, MKA uses defined MKPDU (MACsec Key Agreement Protocol Data Unit).

"parameter sets" for extending various functions within the MKA protocol. To add attestation compelled capabilities within MKA, a new "attestation parameter set" (or the like) would be to find that would identify the ability of two or more peers 102, 106 to transport attestation messages, and in line with EAPoL-MKA, would advertise capabilities of the sending station 102. The EAPol is the EAP (Extensible Authentication Protocol) over LAN (Local Area Network).

Figure 3:
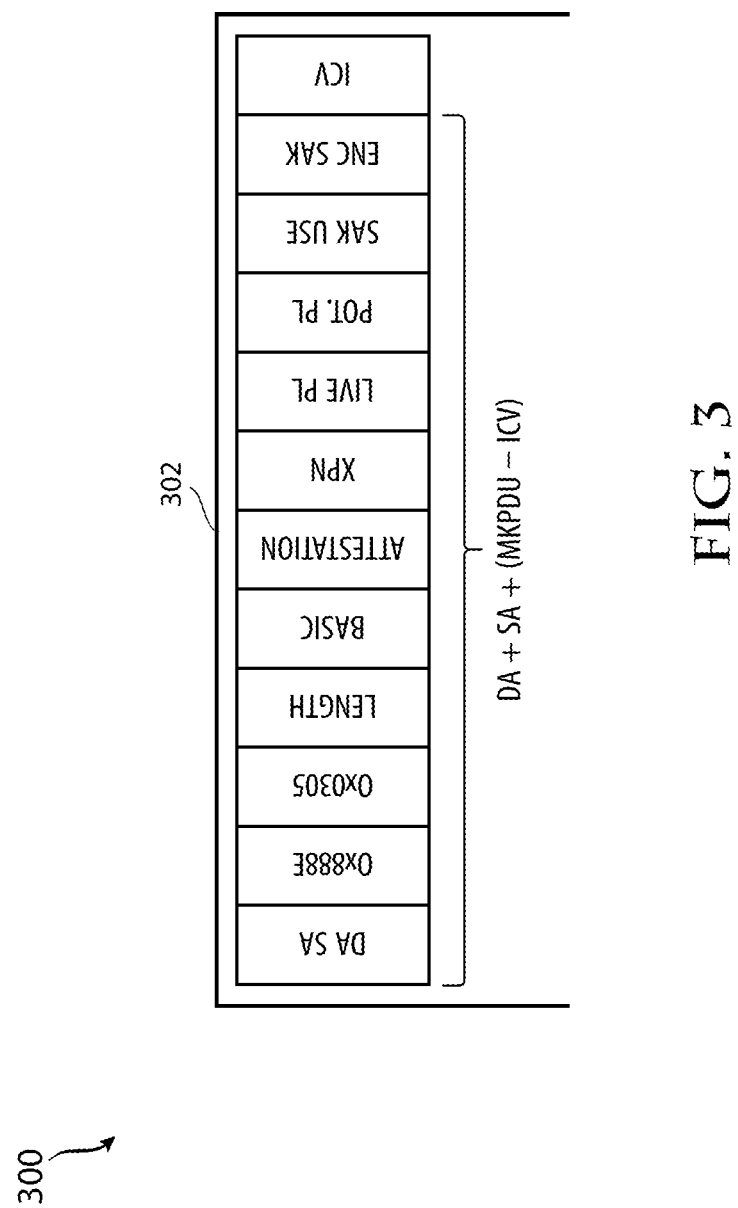
FIG. 3 illustrates the existing SecTAG format.

The proposed concept can include attestation information as described as described above in the canary stamp, as well as other relevant device specific capabilities derived from the TPM as the root of trust for the device. FIG. 3 illustrates an example amendment to increase the MKA version identifier. A new attestation paramset 302 can be provided in the overall protocol structure 300. Only after a successful validation of attestation paramset 302, with the potential peer be transitioned to a live peer mode in which the communication can occur. The transition can be from a potential mode in which a node has the potential to communicate with another mode but the communication will not occur until the attestation data and/or identity data is confirmed. The attestation paramset 302 received from an already live peer can be ignored in one aspect. In another aspect, for backward capability, the attestation validation can be controlled by a local policy parameter such as by allowing MKA peers running with a certain version of the protocol or lower. In one aspect, a local node does not support the ability to evaluate the attestation paramset. In such a case, local policies may cause the remote node not to prepare and send the attestation paramset before a communication.

Figure 4A:
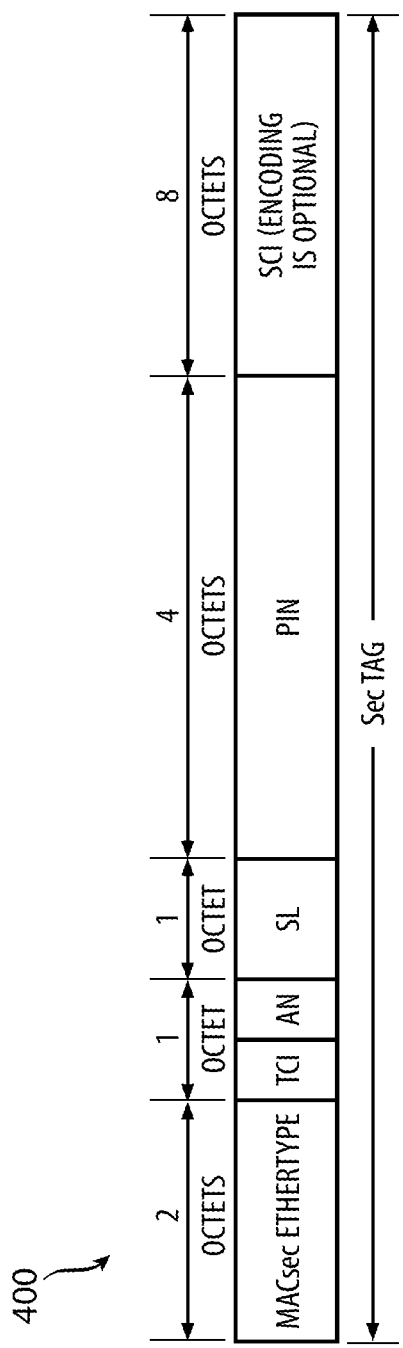
FIG. 4A illustrates the SecTAG format.

In another aspect, if the MACsec protocol is programmed by a control plain protocol which doesn't support the attestation or if the SAK is directly programmed or for continuous attestation for back piggybacked into selected data packets, the MACsec can enforce the attestation if enabled. The system can transmit the attestation header as part of a newly defined SecTAG extension 400 as shown in FIG. 4A. The new header would include an attestation component which carries the attestation header/data that would be part of the MACsec header.

Figure 4B:
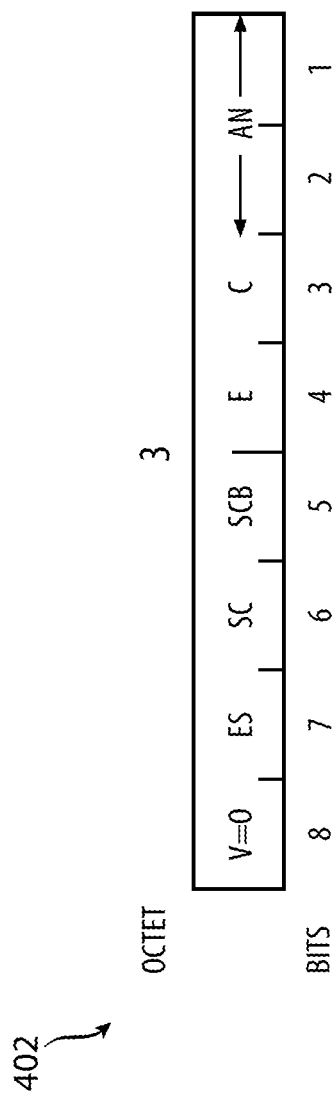
FIG. 4B illustrates the MAGsec TCI and AN Encoding.

FIG. 4B illustrates 402 the MACsec TCI and AN encoding. The TCI bit 8 (version) (0 is the version shown) would be updated such that the version would be shown as v=1 and a new section extensions header would be provided in the new version.

In one aspect, assume as is shown in FIG. 1, that one peer 102 is sending attestation information and another peer 106 is also sending attestation information. Assume that two routers in the network 104 will also send attestation information. Through the principles disclosed herein, the peer 102 may continue to send attestation information until it has properly received and confirmed through the attestation data defined herein, the other node 106 and the two routers in the network 104. Then it can stop sending its attestation data and can move to live peer mode and communication with the other node 106. The system will essentially confirm and validate each node or device in a communication.

Figure 5:
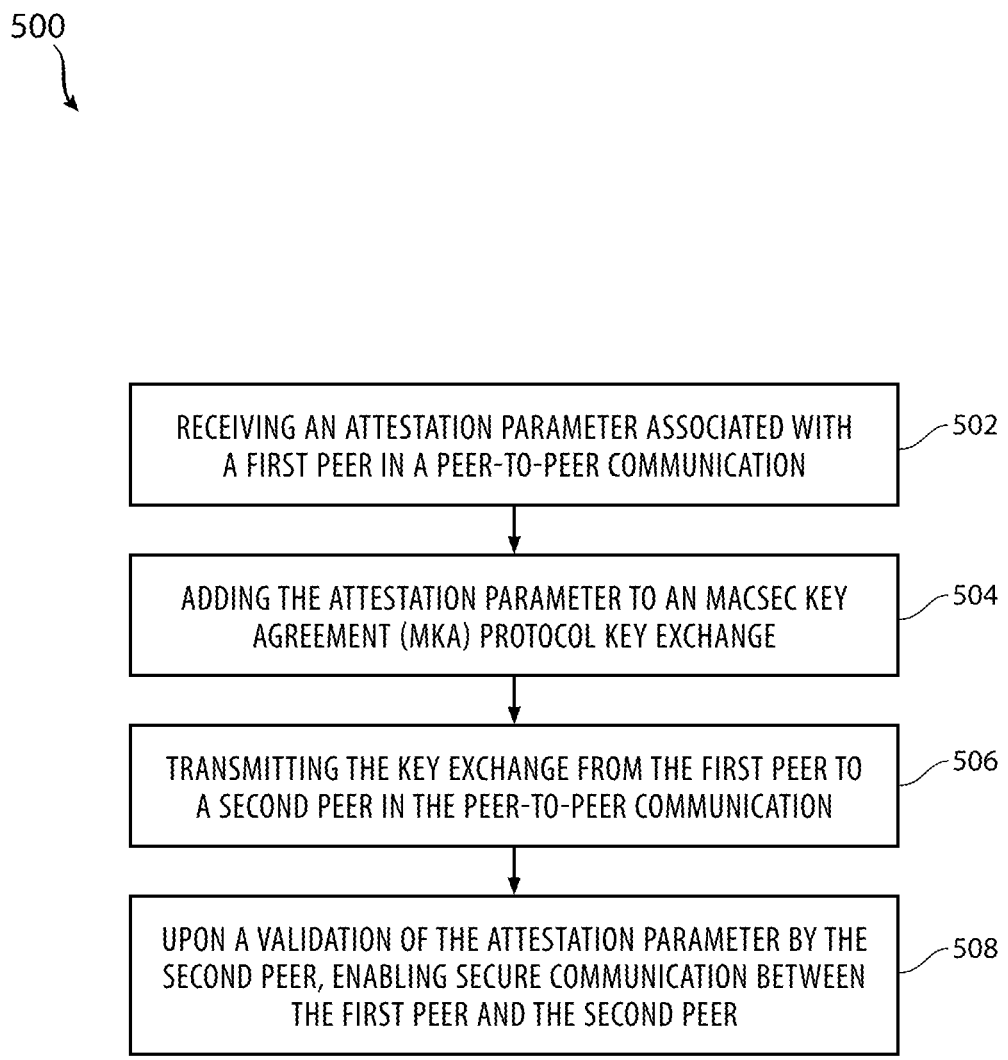
FIG. 5 illustrates a method embodiment.

FIG. 5 illustrates a method example. The method can include one or more of receiving an attestation parameter associated with a first peer in a peer-to-peer communication (502), adding the attestation parameter to an MACsec Key Agreement (MKA) protocol key exchange (504), transmitting the key exchange from the first peer to a second peer in the peer-to-peer communication (506) and upon a validation of the attestation parameter by the second peer, enabling secure communication between the first peer and the second peer (508).

In one aspect a node that will evaluate a canary stamp in a MACsec protocol needs to announce that it has the capability of performing such analysis. Such a node can transmit an advertisement that it is capable of evaluating the attestation parmset or canary stamp data. This can be called an announcement paramset. Another device in the system that also has the capability of producing the canary stamp or similar data then, in response to the advertisement, will provide the data which can be integrated or inserted into the MACsec protocol for establishing the secure communication. There may also be local policies to one or more of the nodes that also need to be fulfilled or followed. For example, for every MACsec installation, a policy may require that there is a revalidation of the attestation periodically, upon a triggering event, or based on some other parameter or event.

This disclosure adds an in-depth layer of attestation information to IEEE 802.1AE MACsec by leveraging the control plane key exchange protocol of the MKA protocol, extending the MKA protocol to support transporting attestation information or messages between two or more MACsec stations. In another aspect, this disclosure extends the MACsec data plane to support transporting attestation information between two or more MACsec stations piggybacked into the data packets.

In one example, the use of the attestation parameters can be handled in the control plane key exchange protocol of the MKA protocol. The confirmation of the attestation parameters in the control plane can alleviate the need for the continued or separate confirmation of attestation parameters in the data plane using the MACsec. However, local policies may also require using the attestation parameters in the data plane/MACsec as well.

Adding the attestation parameter to an MKA protocol key exchange further can include adding the attestation parameter to a SecTAG header of a MACsec protocol. In another aspect, the validation of the attestation parameter by the second peer causes the second peer to transition to a live peer mode. This can be a transition from a non-live mode or a down mode in which no secure communication is provided. The method can further include, after establishing the live peer mode for the second peer to engage in the secure communication, confirming the secure communication via an exchange of a second MKA protocol key exchange having a second attestation parameter added thereto. The attestation parameter can also be configured in a new SecTAG extension header. The new SecTAG extension header can have the attestation parameter as part of the MACsec protocol. In this regard, the approach enables the use of attestation parameters in the data plane which can further enhance the ability of devices to confirm the integrity of other devices in the network that are involved in a secure communication.

Figure 6:
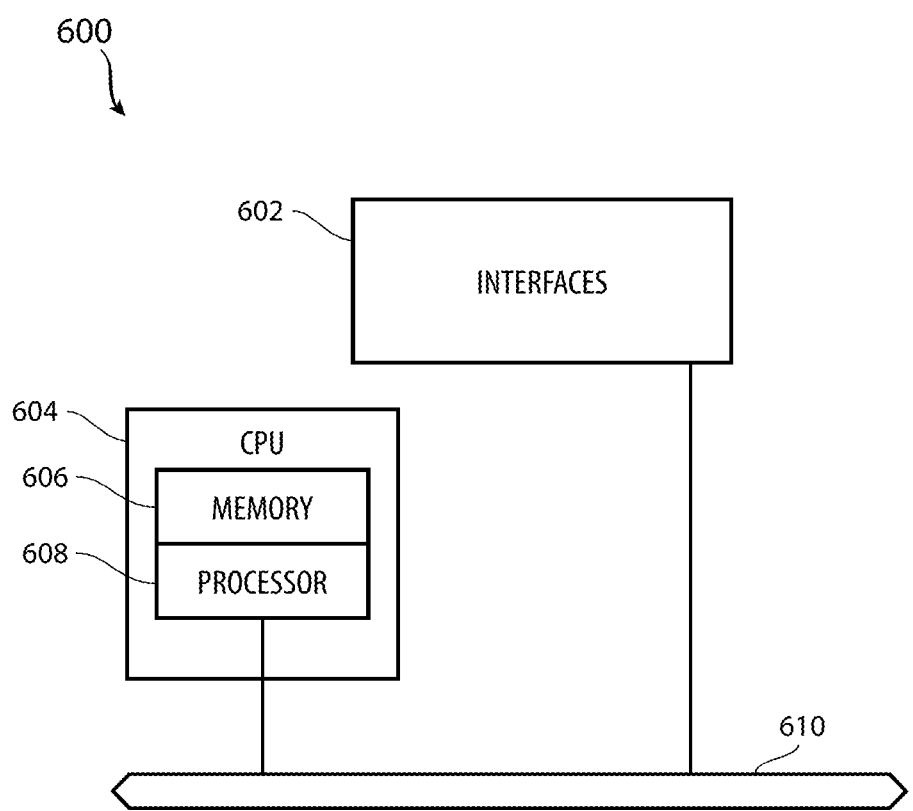
FIG. 6 illustrates an example network device in accordance with various examples.

FIG. 6 illustrates an example network device 600 suitable for implementing aspects of this disclosure. In some examples, the control plane 310 and/or the SVP 318 may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces. Ethernet interfaces, Gigabit Ethernet interfaces, ATM interfaces. HSSI interfaces, POS interfaces. FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
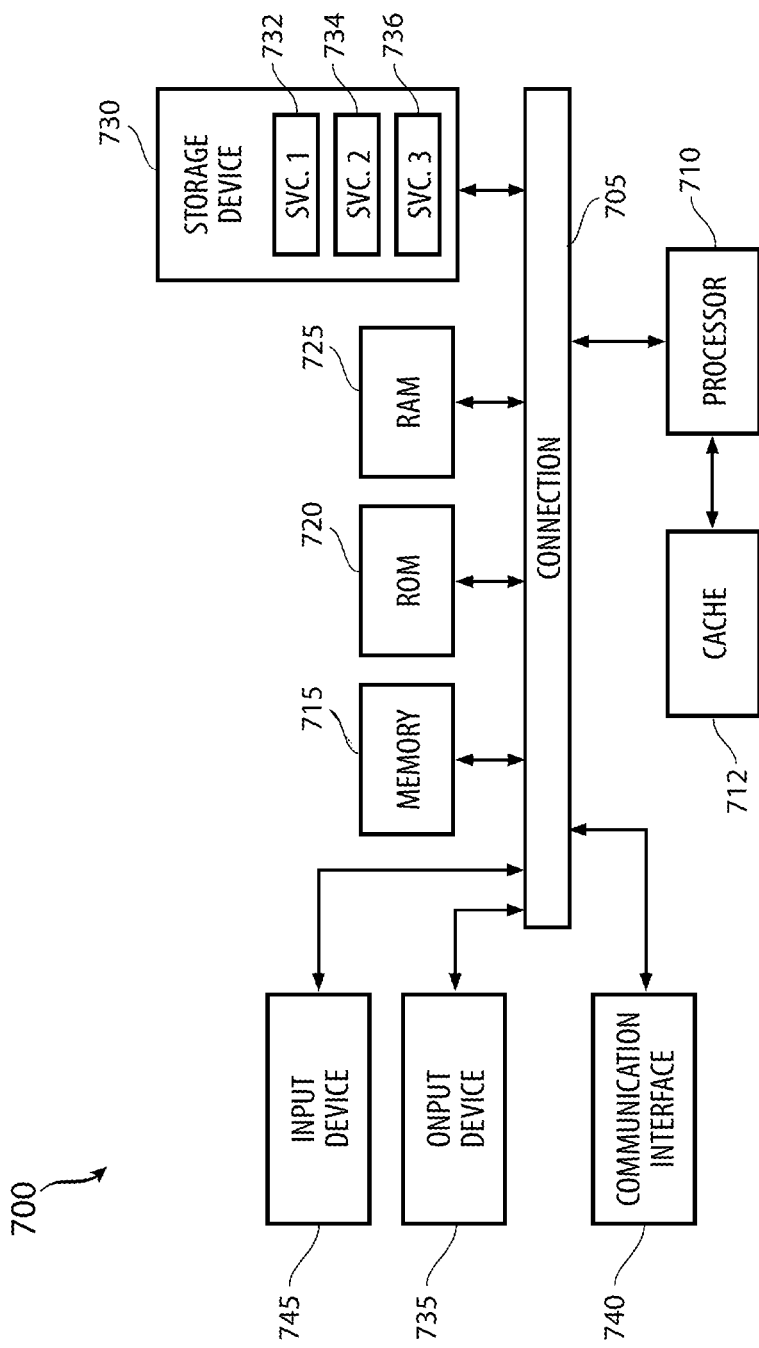
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software.

The present disclosure provides a proposed BFD low bandwidth implementation which can reduce the BFD overhead buy as much as 50% which would provide a large gain for SDWAN (software-defined networking in a wide-area network) customers.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving an attestation parameter associated with a first peer in a potential peer-to-peer communication;
   adding the attestation parameter to a MACsec Key Agreement (MKA) protocol key exchange, wherein adding the attestation parameter to the MKA protocol key exchange further comprises adding the attestation parameter to a SecTAG header of a MACsec protocol;
   transmitting the MKA protocol key exchange from the first peer to a second peer in the potential peer-to-peer communication; and
   upon a validation of the attestation parameter by the second peer, enabling secure communication between the first peer and the second peer.

2. The method of claim 1, wherein the validation of the attestation parameter by the second peer causes the second peer to transition to a live peer mode.

3. The method of claim 2, further comprising:
   after establishing the live peer mode for the second peer to engage in the secure communication, confirming the secure communication via an exchange of a second MKA protocol key exchange having a second attestation parameter added thereto.

4. The method of claim 1, wherein one of the first peer or the second peer comprises a router in a network.

5. The method of claim 1, wherein the attestation parameter is configured in a new SecTAG extension header.

6. The method of claim 5, wherein the new SecTAG extension header having the attestation parameter is part of a MACsec header.

7. A system comprising:
a processor; and
a computer-readable storage device storing instructions which, when executed by the processor, causes the processor to perform operations comprising:
receiving an attestation parameter associated with a first peer in a potential peer-to-peer communication;
adding the attestation parameter to a MACsec Key Agreement (MKA) protocol key exchange, wherein adding the attestation parameter to the MKA protocol key exchange further comprises adding the attestation parameter to a SecTAG header of a MACsec protocol;
transmitting the MKA protocol key exchange from the first peer to a second peer in the potential peer-to-peer communication; and
upon a validation of the attestation parameter by the second peer, enabling secure communication between the first peer and the second peer.

8. The system of claim 7, wherein the validation of the attestation parameter by the second peer causes the second peer to transition to a live peer mode.

9. The system of claim 8, further comprising:
after establishing the live peer mode for the second peer to engage in the secure communication, confirming the secure communication via an exchange of a second MKA protocol key exchange having a second attestation parameter added thereto.

10. The system of claim 7, wherein one of the first peer or the second peer comprises a router in a network.

11. The system of claim 7, wherein the attestation parameter is configured in a new SecTAG extension header.

12. The system of claim 11, wherein the new SecTAG extension header having the attestation parameter is part of a MACsec header.

13. A computer-readable storage device storing instructions which, when executed by a processor, causes the processor to perform operations comprising:
receiving an attestation parameter associated with a first peer in a potential peer-to-peer communication;
adding the attestation parameter to a MACsec Key Agreement (MKA) protocol key exchange, wherein adding the attestation parameter to the MKA protocol key exchange further comprises adding the attestation parameter to a SecTAG header of a MACsec protocol;
transmitting the key exchange from the first peer to a second peer in the potential peer-to-peer communication; and
upon a validation of the attestation parameter by the second peer, enabling secure communication between the first peer and the second peer.

14. The computer-readable storage device of claim 13, wherein the validation of the attestation parameter by the second peer causes the second peer to transition to a live peer mode.

15. The computer-readable storage device of claim 14, further comprising:
after establishing the live peer mode for the second peer to engage in the secure communication, confirming the secure communication via an exchange of a second MKA protocol key exchange having a second attestation parameter added thereto.

16. The computer-readable storage device of claim 13, wherein one of the first peer or the second peer comprises a router in a network.

17. The computer-readable storage device of claim 13, wherein the attestation parameter is configured in a new SecTAG extension header.

* * * * *